US006430495B2

(12) United States Patent
Takaku et al.

(10) Patent No.: US 6,430,495 B2
(45) Date of Patent: Aug. 6, 2002

(54) DIAGNOSING SYSTEM FOR ENGINE

(75) Inventors: Yutaka Takaku; Toshio Ishii, both of Mito; Toshiharu Nogi, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/902,606

(22) Filed: Jul. 12, 2001

Related U.S. Application Data

(63) Continuation of application No. 09/372,984, filed on Aug. 12, 1999, now Pat. No. 6,330,510.

(30) Foreign Application Priority Data

Aug. 12, 1998 (JP) .......................................... 10-227834

(51) Int. Cl.[7] .......................... G06F 19/00; F02B 17/00
(52) U.S. Cl. ........................ 701/114; 123/295; 701/111
(58) Field of Search ................................ 123/295, 305; 701/110, 111, 114, 115

(56) References Cited

U.S. PATENT DOCUMENTS 5,487,008 A * 1/1996 Ribbens et al. ............. 701/111
5,713,325 A * 2/1998 Yoshida et al. ............. 123/295
5,870,992 A * 2/1999 Kamura et al. ............. 123/305
5,937,822 A * 8/1999 Nakajima .................. 123/295
5,947,077 A * 9/1999 Yonezawa et al. .......... 123/295
6,019,082 A * 2/2000 Mashiki et al. ............. 123/295

* cited by examiner

*Primary Examiner*—Willis R. Wolfe
(74) *Attorney, Agent, or Firm*—Crowell & Moring LLP

(57) ABSTRACT

A diagnosing system for an engine diagnoses malfunctions that occur in a direct-injection engine in which fuel is injected into combustion chambers or a lean-burn engine. The present invention provides a diagnosing system for an engine capable of diagnosing malfunctions in an intake air flow intensifying component and a fuel supply component and of specifying a malfunctioning part without being affected by the difference between different engines, the difference in quality between parts and aging. The diagnosing system for an engine comprises: a selecting component for selecting either a first air-fuel mixture control component or a second air-fuel mixture control component according to operating condition of an engine; a combustion condition detecting component for detecting combustion condition of the engine; and decision component for deciding a malfunction on the basis of a first combustion condition detected by the combustion condition detecting component in a state where the first air-fuel mixture control component is selected by the selecting component, and a second combustion condition detected by the combustion condition detecting component in a state where the second air-fuel mixture control component is selected by the selecting component.

12 Claims, 10 Drawing Sheets

DIAGNOSING SYSTEM FOR ENGINE

This application is a continuation of application Ser. No. 09/372,984, filed Aug. 12, 1999, now U.S. Pat. No. 6,330, 510.

BACKGROUND OF THE INVENTION

The present invention relates to a diagnosing system for an engine and, more particularly, to a diagnosing system for an engine suitable for diagnosis in a direct-injection engine in which fuel is injected directly into combustion chambers or a lean-burn engine.

Techniques for using a lean mixture having an air-fuel ratio greater than the theoretical air-fuel ratio, i.e., the stoichiometric air-fuel ratio, have become prevalent with the progressively increasing severity of environmental protection regulations and a growing tendency for environmental protection to reduce the fuel consumption of engines. Gasoline engines are classified into those of the port injection system which injects a fuel into the suction port to supply an air-fuel mixture of an air-fuel ratio in the range of about 20 to about 25 for lean-burn combustion and those of the direct fuel injection system (hereinafter referred to as "cylinder injection system") which injects a fuel directly into the combustion chamber to supply a very lean air-fuel mixture having an air-fuel ratio in the range of about 40 to about 50. The fuel consumption of the lean-burn engine is small because pumping loss and thermal diffusion in the lean-burn engine are low.

The port injection system, for instance, promotes the mixing of fuel and air by positively forming swirls of intake air by an intake air flow intensifying means, such as a swirl forming valve, to stabilize lean combustion. The cylinder injection system localizes the distribution of the fuel in the cylinder so that fuel concentration of the air-fuel mixture around the spark plug is increased by positively producing air flow by properly determining fuel injection timing, using intake air flow intensifying means, such as a swirl control valve or a tumble control valve, and properly determining the shape of a cavity over the piston to enable very lean combustion.

The port injection system supplies a lean air-fuel mixture to the engine for lean combustion in an operating mode requiring relatively low output, and supplies a stoichiometric or rich air-fuel mixture to the engine in an operating mode requiring high output. The cylinder injection system injects the fuel into the cylinder of the engine for stratified combustion in an operating mode requiring relatively low output, and injects the fuel into the cylinder of the engine so that a homogeneous air-fuel mixture is produced in the cylinder for lean combustion using an air-fuel mixture having an air-fuel ratio in the range of about 20 to about 25, stoichiometric combustion or rich combustion in an operating mode requiring higher output. The port injection system supplies a homogeneous lean air-fuel mixture or a homogeneous stoichiometric air-fuel mixture according to the operating condition of the engine. The cylinder injection system supplies a stratified lean air-fuel mixture, a homogeneous lean air-fuel mixture or a stoichiometric air-fuel mixture according to the operating condition of the engine.

Lean burning is realized by an air-fuel mixture supply means including the intake air flow intensifying means and the fuel supply means. If those means do not function properly, unstable combustion occurs. If unstable combustion occurs, part of the fuel does not burn, the raw fuel is discharged and the injurious gas concentration, such as Co and NOx concentration, of the exhaust gas is liable to increase. If the injurious gas concentration of the exhaust gas discharged from the engine is extraordinarily high, the exhaust gas purifying means, such as a catalytic converter, included in the exhaust system is unable to purify the exhaust gas satisfactorily. Consequently, an increased amount of injurious gases is emitted into the atmosphere, vibrations are generated due to torque variation, the catalyst is burnt due to the burning of the unburned gas in the catalytic converter, and fuel consumption rate increases. Regulations require the diagnosis of a malfunction which increases injurious gases abnormally by an on-vehicle control unit. Such regulations requiring self-diagnostic operations are enforced currently in the U.S.A. and the enforcement of such regulations are under consideration in Europe and Japan.

A malfunction detecting technique, such as a technique for diagnosing combustion state including misfiring, is disclosed in Japanese patent No. 2,559,509. This technique estimates a combustion state on the basis of the variation of engine speed.

There have been disclosed many other techniques including a technique which estimates a combustion state from an ion current that flows between electrodes placed in a combustion chamber, a technique which estimates a combustion state from combustion pressure in the combustion chamber measured by a combustion pressure sensor placed near the combustion chamber, and a technique which estimates a combustion state from the output torque of the engine.

Although those known techniques are able to detect the deterioration of the combustion state due to, for example, misfiring, the same are unable to identify the malfunction of the intake air flow intensifying means and the fuel supply means. Therefore, other detecting means must be added to the engine or the engine must be examined by engineers at a maintenance shop spending much time.

When the fuel is supplied by the cylinder injection system for stratified combustion, the fuel is distributed in the cylinder in an unexpected distribution if the fuel is injected by a fuel injection valve in a spray condition greatly different from a desired spray condition or the intake air flow intensifying means malfunctions, and a large amount of unburned gas is discharged even if combustion is stable. If such a malfunction occurs in a specific cylinder among a plurality of cylinders, combustion pressures in other cylinders and torque produced by the same decrease slightly. Therefore it is possible to detect the malfunction by the conventional technique. However, it is difficult to discriminate between an abnormal condition and a normal condition because the different cylinders are by nature different from each other in operating condition. It is difficult to detect a subtle malfunction because different engines have different characteristics and different parts, and the condition of the engine changes with time.

The present invention has been made in view of those problems in the conventional techniques and it is therefore an object of the present invention to provide a diagnosing system for an engine capable of diagnosing malfunctions in an intake air flow intensifying means and a fuel supply means without being affected by difference in characteristics between different engines, difference in parts and the change of the condition of the engine with time, and of specifying the cause of the malfunction.

SUMMARY OF THE INVENTION

The present invention provides a diagnosing system for an engine for diagnosing malfunctions in an engine comprising:

a selecting means for selecting a first air-fuel mixture control means or a second air-fuel mixture control means according to the operating condition of an engine; a combustion condition detecting means for detecting the combustion state of the engine; and a condition deciding means for deciding an abnormal function on the basis of a first combustion condition detected by the combustion condition detecting means in a state where the first air-fuel mixture control means is selected by the selecting means, and a second combustion condition detected by the combustion condition detecting means in a state where the second air-fuel mixture control means is selected by the selecting means.

In the diagnosing system for an engine, it is preferable that the condition deciding means decides a condition on the basis of a combustion condition in a state where the first or the second air-fuel mixture control means is selected by the selecting means and the engine is operating under substantially the same operating conditions at least in fuel supply rate and load, such as generated torque.

In the diagnosing system for an engine, it is preferable that the deciding means decides a condition on the basis of combustion conditions before and after change from the first to the second air-fuel control means or change from the second to the first air-fuel control means.

Preferably, the diagnosing system for an engine comprises a selecting means which selects either the first air-fuel mixture control means which supplies the fuel so that an air-fuel mixture has a homogeneous fuel concentration or the second air-fuel mixture control means which supplies the fuel so that an air-fuel mixture has a stratified fuel concentration.

Preferably, the diagnosing system for an engine comprises a selecting means which selects the first air-fuel mixture control means which supplies the fuel so that a stoichiometric air-fuel mixture having a stoichiometric air-fuel ratio is produced or the second air-fuel mixture control means which supplies the fuel so that a lean air-fuel mixture having an air-fuel ratio greater than a stoichiometric air-fuel ratio is produced.

Preferably, the diagnosing system for an engine comprises a combustion condition detecting means which detects combustion condition on the basis of the operating speed of the engine.

Preferably, the diagnosing system for an engine comprises a combustion condition detecting means which detects combustion condition on the basis of pressure in the combustion chamber of the engine.

Preferably, the diagnosing system for an engine decides that the air flow intensifying means is abnormal when the difference between the first and the second combustion condition is not smaller than a predetermined value.

Preferably, the diagnosing system for an engine decides that a fuel supply means for supplying the fuel to a cylinder is abnormal when the difference between the first and the second combustion condition in the same cylinder is not smaller than a predetermined value.

Preferably, the diagnosing system for an engine inhibits the operation of the selecting means for selecting either the first or the second air-fuel control to hold a fuel supply mode using the first air-fuel control means or the second air-fuel control means when a malfunction is diagnosed.

Preferably, the selecting means of diagnosing system for an engine changes an operating condition in which the selecting means executes its function when a malfunction occurs.

Preferably, the diagnosing system for an engine comprises at least either a malfunction storage means for storing information about a malfunction or a malfunction warning means for giving a warning when a malfunction occurs.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
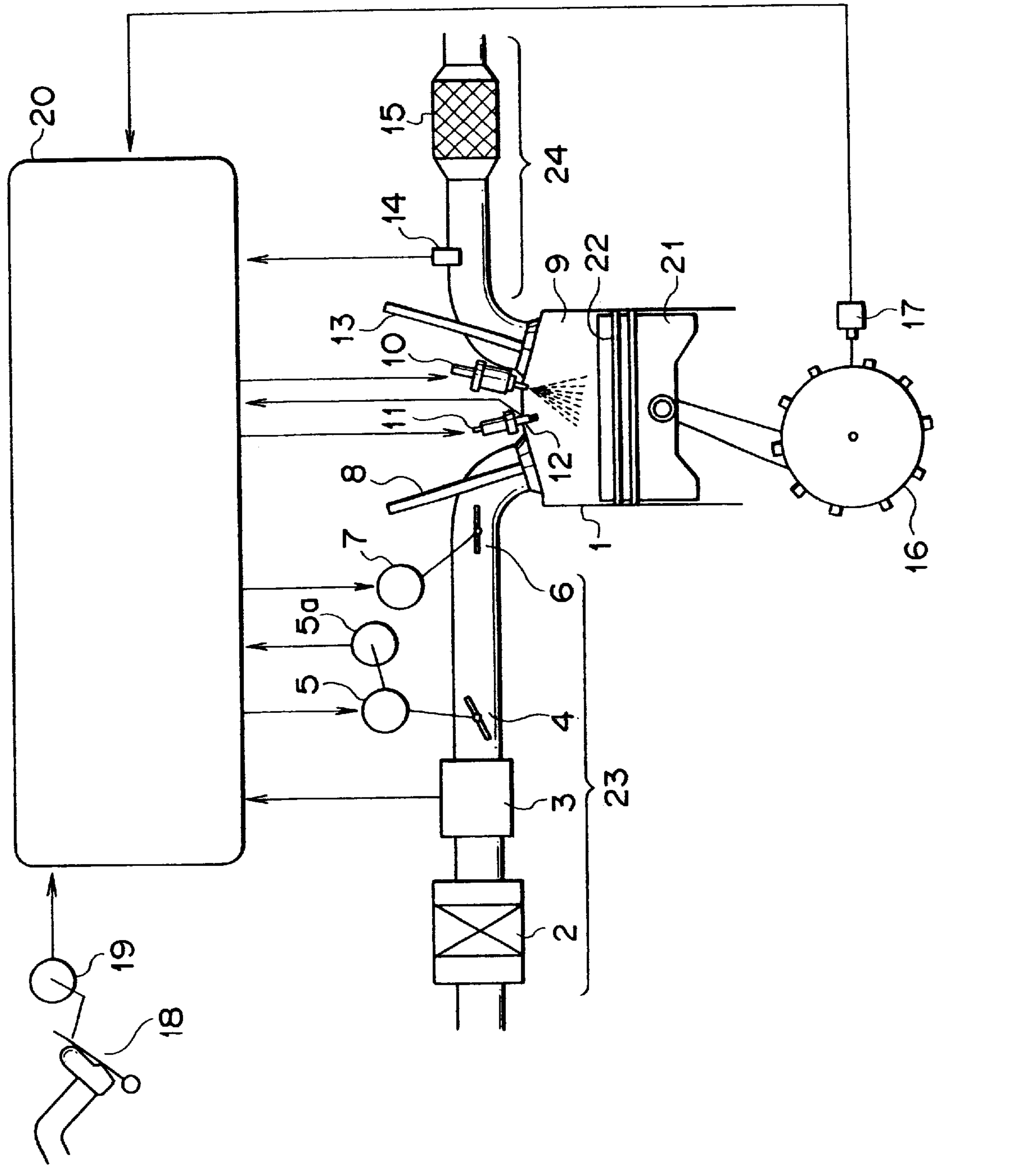
FIG. 1 is a diagrammatic view of an engine provided with an air-fuel ratio control system in a preferred embodiment according to the present invention.

FIG. 1 shows an engine provided with an air-fuel ratio control system in a preferred embodiment according to the present invention. The engine is of a cylinder injection system. The engine 1 has an intake system 23 having an air cleaner 2, an air flow sensor for measuring intake air, a throttle valve 4 for regulating flow of intake air, a throttle valve driving device 5, a throttle opening sensor 5*a,* swirl control valves 6, a swirl control valve driving device 7 and intake valves 8. The swirl control valves 6 are disposed immediately before the intake valves 8 of the cylinders, respectively, and are operated simultaneously. Each of combustion chambers 9 of the engine 1 is provided with a fuel injection valve 10 for directly injecting the fuel into the combustion chamber 9, a spark plug 11 and a cylinder pressure sensor 12. The engine 1 has an exhaust system 23 including exhaust valves 13, an air-fuel ratio sensor 14 and a catalytic converter 15. The engine 1 is provided with a sensing plate 16 mounted on the crankshaft of the engine 1 and provided with projections, and a crank angle sensor 17 for measuring engine speed and crank angle through the detection of the projections of the sensing plate 16, and an accelerator stroke sensor 19 for measuring the stroke of an accelerator pedal 18.

The sensors give detection signals to an electronic control unit (hereinafter abbreviated to "ECU") 20. The ECU 20 detects or calculates such as accelerator stroke, intake air quantity, engine speed, crank angle, cylinder pressure and throttle opening. The ECU determines the quantity of the fuel to be injected into the engine 1 and fuel injection timing by calculation, and gives a driving pulse to the fuel injection valve 10. The ECU 20 calculates the opening of the throttle valve 4, gives a control signal to the throttle valve control device 5, and calculates ignition timing and gives an ignition signal to the spark plug 11.

The fuel is pumped by a fuel pump from a fuel tank, not shown. The fuel is held at a predetermined pressure in the range of about 5 to 15 MPa by a fuel pressure regulator. The fuel is supplied to the fuel injection valve 10. The fuel pump is controlled by the driving pulse provided by the ECU 20 to inject a predetermined quantity of the fuel at predetermined time directly into the combustion chamber 9. The fuel is injected into the combustion chamber 9 in a period corresponding to a suction stroke to mix the fuel with intake air while the engine 1 is operating in a homogeneous combustion mode. The fuel is injected into the combustion chamber 9 in a period corresponding to a compression stroke to collect the fuel in the vicinity of the spark plug 11 while the engine 1 is operating in a stratified combustion mode.

The intake air metered by the throttle valve 4 flows through the intake valve 8 into the combustion chamber 9. At this time, the swirl control valve 6 controls swirling intensity. The swirling intensity of the intake air is high for a lean stratified combustion mode and a lean homogeneous combustion mode, and is low for other combustion modes. A cavity 22 formed in the top surface of a piston 21 is designed and the fuel injection timing and the swirling of the intake air are adjusted so that the fuel may not spread in the entire combustion chamber 9 and may be collected around the spark plug 11 particularly, when the engine 1 is operating in a stratified combustion mode.

An air-fuel mixture, i.e., a mixture of intake air and the fuel, is ignited by the spark plug 9 and burns. An exhaust gas produced by the combustion of the air-fuel mixture is discharged through the exhaust valve 13 into the exhaust system 24. The catalytic converter 15 converts injurious gases contained in the exhaust gas into harmless or less harmful products. The catalytic converter 15 has both the ability of a three-way catalytic converter capable of purifying the exhaust gas discharged while the engine 1 is operating in a stoichiometric combustion mode, and the ability of an NOx adsorber capable of reducing NOx while the engine 1 is operating in a lean combustion mode.

An air-fuel ratio sensor 14 provides a signal representing the oxygen concentration of the exhaust gas produced by combustion. The air-fuel ratio of the air-fuel mixture to be supplied to the engine 1 is controlled in a feedback control mode on the basis of the air-fuel ratio measured by the air-fuel ratio sensor 14 to adjust the air-fuel ratio to a desired air-fuel ratio. If the air-fuel ratio sensor 14 provides a binary value around the stoichiometric air-fuel ratio, the air-fuel ratio is controlled in a feedback control mode only when the engine 1 is operating in a stoichiometric combustion mode.

An EGR control valve (exhaust gas recirculation control valve), not shown, is placed in a passage connecting the exhaust system 24 to the intake system 23 for introducing a large amount of the exhaust gas to suppress the generation of NOx and to suppress the excessive increase in combustion velocity particularly when the engine is operating in a stratified combustion mode.

Figure 2:
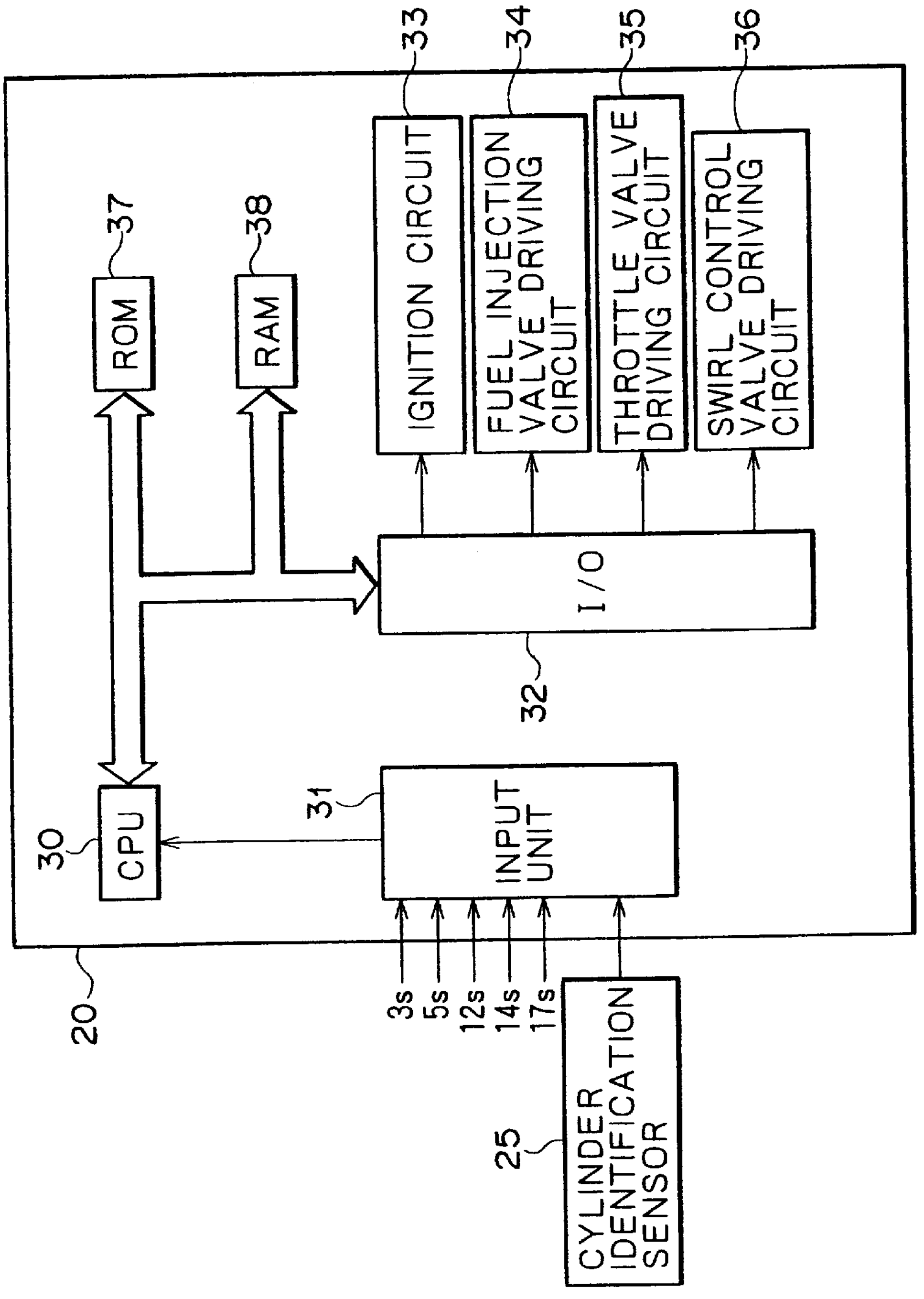
FIG. 2 is a block diagram of an ECU.

Referring to FIG. 2, the ECU 20 has an input circuit 31 which receives the output signals 3*s*, 5*s*, 12*s*, 14*s* and 17*s* provided respectively by the air flow sensor 3, the throttle opening sensor 5*a*, the cylinder pressure sensor 12, the air-fuel sensor 14 and the crank angle sensor 17. The input circuit 31 also receives the output signal of a cylinder identification sensor 25. A CPU 30 reads those input signals applied to the input circuit 31 and executes data processing operations according to programs and constants stored in a ROM 37. Signals representing ignition time, an injector driving pulse width, injector driving time, a throttle valve opening and a swirl control valve opening calculated by the CPU 30 are given through an I/O unit 32 to an ignition circuit 33, a fuel injection valve driving circuit 34, a throttle valve driving circuit 35 and a swirl control valve driving circuit 36. Consequently, operations for ignition, fuel injection, throttle valve opening control and swirl control valve opening control are executed. Input signals and calculated results are stored in a RAM 38.

Figure 3:
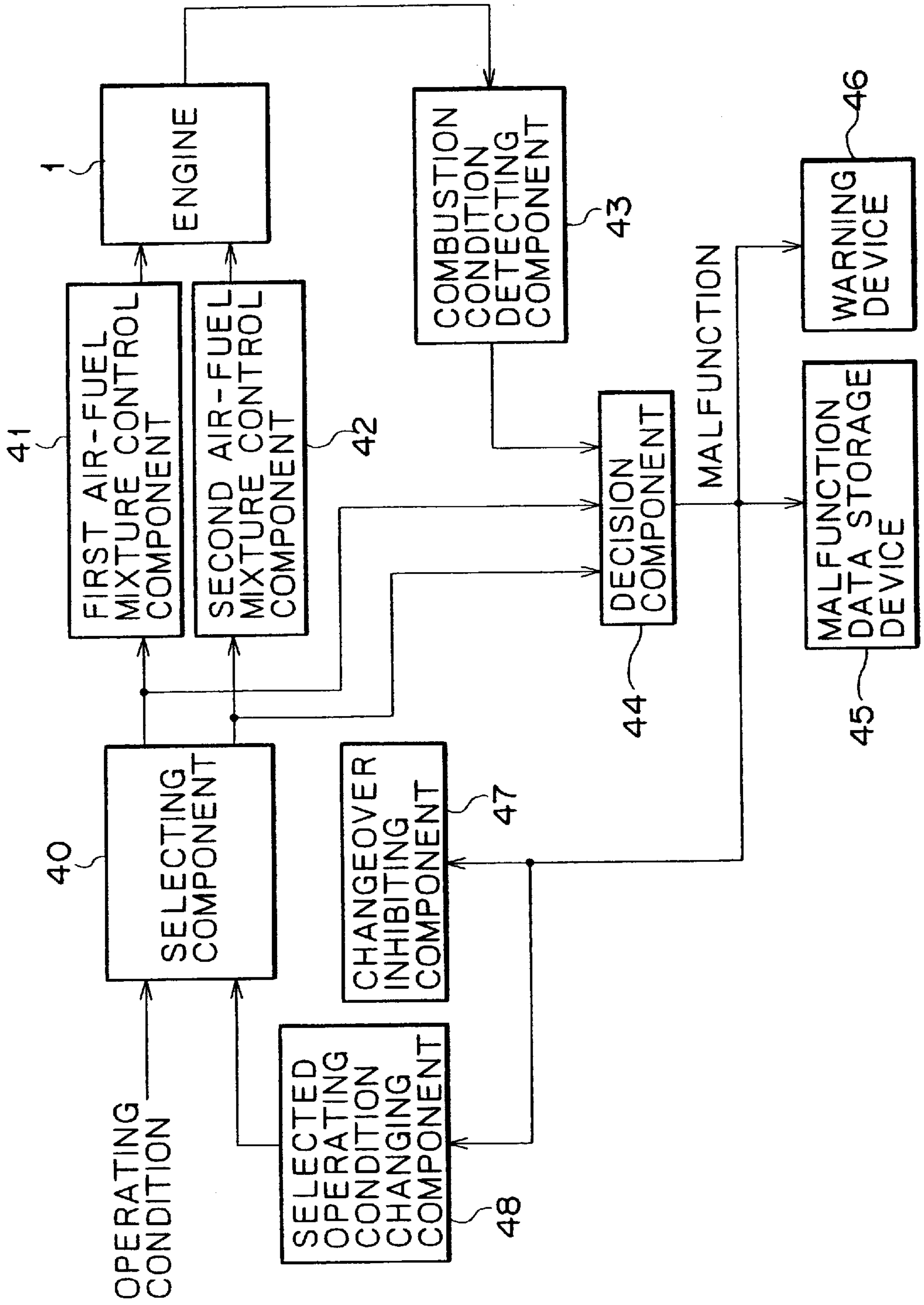
FIG. 3 is a block diagram of the air-fuel control system embodying the present invention.

Referring to FIG. 3, a selecting component 40 determines an operating mode and selects a fuel supply device on the basis of values of parameters indicating an operating condition, such as engine speed, accelerator stroke, intake air amount and traveling speed. For instance, a stratified combustion mode is selected for an operating condition where required output is relatively low and stratified combustion can easily be achieved, a homogeneous stoichiometric combustion mode or a rich combustion mode is selected for an operating condition where required output is high and stratified combustion and lean combustion are difficult to be achieved, and a homogeneous lean combustion mode is selected for an operating condition where moderate output is required. This embodiment has substantially three air-fuel mixture control components respectively for a stratified combustion mode, a homogeneous lean combustion mode and a homogeneous stoichiometric combustion mode. Essentially, the present invention compares combustion conditions controlled by two different air-fuel control components to diagnose the malfunction of a fuel supply component and does not limit the types of all the air-fuel mixture control components to two types, which will more concretely be described later. The selecting component 40 selects either a first air-fuel mixture control component 41 or a second air-fuel mixture control component 42 to control the air-fuel ratio of an air-fuel mixture to be supplied to the engine 1. It should be noted that the term "air-fuel mixture control component" designates a unit including a fuel supply component and an air flow intensifying component. A combustion condition detecting component 43 detects the combustion condition of the air-fuel mixture in the engine 1, and provides a signal representing a first combustion condition or a second combustion condition according to the air-fuel mixture control component selected by the selecting component 40. A decision component 44 decides whether or not the engine 1 is malfunctioning on the basis of the first combustion condition and the second combustion condition. When a malfunction is diagnosed, it is preferable to store information about the malfunction and the corresponding operating condition in a malfunction data storage device 45 and to inform the driver of the malfunction by a warning device 46. It is also preferable, when a malfunction is diagnosed, to hold either the first air-fuel mixture control component 41 or the second air-fuel mixture control component 42 selected by inhibiting the air-fuel mixture control component changing operation of the selecting component 40 by a changeover inhibiting component 47. Either the first air-fuel mixture control component 41 or the second air-fuel mixture control component 42 is selected and held effective depending on the type of the detected malfunction. For example, if it is decided that the air flow intensifying component is malfunctioning, the operation of the engine 1 in the lean combustion mode is inhibited and the engine 1 is operated in the stoichiometric combustion mode. It is preferable to change an operating condition where the air-fuel mixture control component is changed by the selecting component 40 by a selected operating condition changing component 48. For example, if it is decided that the air flow intensifying component is malfunctioning, the range of conditions for operation in the lean combustion mode is narrowed or the air-fuel ratio is reduced, i.e., a richer air-fuel mixture is supplied. All of the malfunction data storage device 45, the warning device 46, the changeover inhibiting component 47 and the selected operating condition changing component 48 are not necessarily indispensable.

This embodiment substantially has the three types of fuel supply units for operations in the stratified combustion mode, the homogeneous lean combustion mode and the homogeneous stoichiometric combustion mode. For instance, the first and the second air-fuel mixture control components may be used for controlling operations in the stratified combustion mode and the homogeneous lean combustion mode, in the homogeneous lean combustion mode and the homogeneous stoichiometric combustion mode, or in the stratified combustion mode and the homogeneous stoichiometric combustion mode.

The effect of a spray pattern in which the fuel injection valve 10 injects the fuel is liable to appear in the comparison of operations in the stratified combustion mode and the homogeneous lean combustion mode. The effect is realized in the difference between torques generated by the cylinder (combustion pressures in the cylinder). The effect of the swirl control valve is another cause. If the swirl control valve malfunctions, differences between torques (combustion pressures) generated by all the cylinders and combustion in all the cylinders become unstable, and the generated torques (combustion pressures) are distributed in a wide range.

Similarly, the effect of the swirl control valve is liable to appear when comparing operations in the homogeneous lean combustion mode and the homogeneous stoichiometric combustion mode. It should be noted that the effect of a spray pattern in which the fuel injection valve 10 injects the fuel is not significant.

Ignition energy required for an operation in the homogeneous lean combustion mode is greater than that required for an operation in the homogeneous stoichiometric combustion mode, and ignition energy required for an operation in the stratified combustion mode is greater than that required for an operation in the homogeneous lean combustion mode. Accordingly, it is possible that the combustion condition is affected when the air-fuel mixture control component is changed in a state where sufficient ignition energy is not available due to a malfunction. A particular one of the cylinders or all the cylinders are affected depending on the configuration of the ignition system and the type of the malfunction. For instance, if the malfunction is a sooty spark plug, the cylinder provided with the same sooty spark plug is affected.

Figure 4:
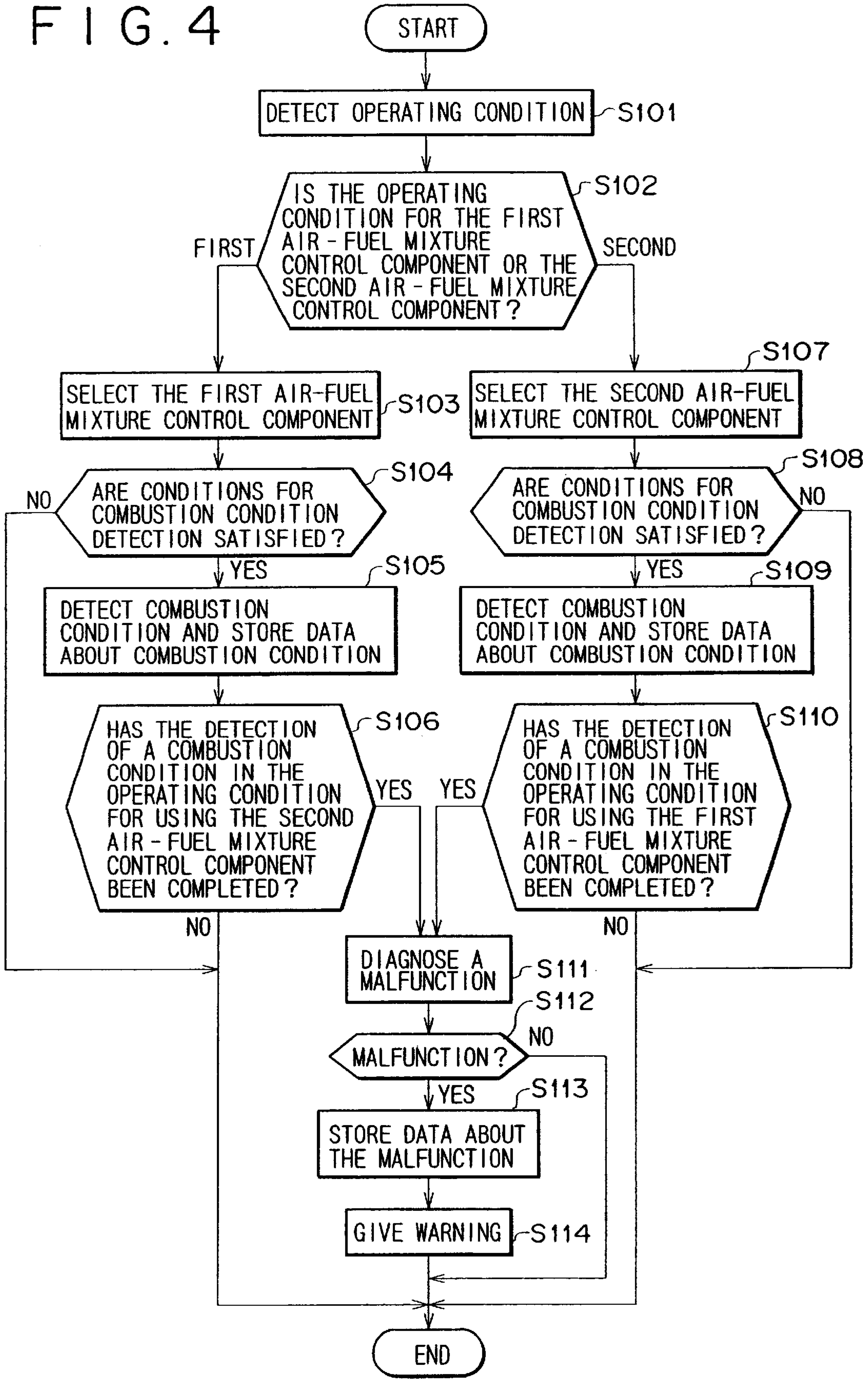
FIG. 4 is a flow chart of a control program to be executed by the air-fuel control system embodying the present invention.

A control program to be executed by the air-fuel ratio control system will be described with reference to FIG. 4. The control program is executed every predetermined time, for example, every 2 ms, or is started at a predetermined crank angle.

An operating condition is detected in step S101. In step S102, the first air-fuel mixture control component or the second air-fuel mixture control component is selected according to the operating condition. When the operating condition requires the first air-fuel mixture control component and the second air-fuel mixture control component is currently in use, the first air-fuel mixture control component is selected and the second air-fuel mixture control component is changed for the first air-fuel mixture control component in step S103. A query is made in step S104 to see if conditions for combustion condition detection are satisfied. For example, conditions for combustion condition detection including conditions that the sensors for detecting combustion condition and load on the engine are functioning normally, and that the engine is in a stable operating mode (combustion condition is not detected while the engine is in sharp acceleration or deceleration or fuel supply is stopped) are examined, and the control program is ended if the conditions for combustion condition detection are not satisfied. If the conditions for the combustion condition detection are satisfied, combustion condition is detected and stored in step S105. It is preferable to store the result of detection, for example, according to the operating condition specified by load and engine speed. In step S106, a query is made to see if the detection of a combustion condition in the operating condition for using the second air-fuel mixture control component is selected has been completed. It is preferable to make an examination to see if the detection of a combustion condition in an operating condition where the second air-fuel mixture control component is selected substantially the same as an operating condition at least in load, such as fuel supply rate and generated torque has been completed. When a combustion state detecting component which uses engine speed is used, it is preferable to see if the detection of a combustion condition in an operating condition substantially the same as an operating condition in respect to engine speed has been completed. If the response in step S106 is negative, i.e., the detection of a combustion condition in an operating condition for the second air-fuel mixture control component has not yet been completed, the control program is ended. If the response in step S106 is affirmative, step S111 is executed to diagnose a malfunction, which will be described later. As mentioned above, it is preferable to decide a condition on the basis of combustion conditions in operating conditions substantially the same in load and engine speed and using the two air-fuel mixture control components because the decision is not subject to the influence of functions other than the function to be examined and the range of variance of parameters, which will be described later, for detecting combustion condition is narrow. It should be noted that, for instance, although fuel supply rates respectively for operations in the homogeneous stoichiometric combustion mode, the homogeneous lean combustion mode and the stratified combustion mode are substantially equal, intake air quantities for the same are greatly different from each other. A condition decided in step S111 is examined in step S112. If any malfunction is not found, the control program is ended. If a malfunction is diagnosed, information about the malfunction is stored in step S113. The stored information is read to facilitate repair work which may be carried out later to collect the malfunction. The information includes, for example, the code of a malfunctioning part and an operating condition in which the engine is operating when the malfunction occurred. In step S114, a warning device is actuated to inform the driver of the malfunction. The warning device may be a warning lamp which is turned on or flickered when a malfunction is diagnosed. The malfunction need not necessarily be stored and the warning need not necessarily be given upon the detection of the malfunction. The malfunction may be stored and a warning may be given after temporarily deciding that a part is malfunctioning, operating the part which is considered to be malfunctioning and confirming that the part is actually malfunctioning. The malfunction may be stored and a warning may be given after the same part has malfunctioned a predetermined number of times. The malfunction may be stored or a warning may be given. If it is decided in step S102 that the second air-fuel mixture control component is selected, steps S107 to S110 are executed. Operations to be executed in steps S107 to S110 are the same as those executed in steps S103 to S106 and hence the description thereof will be omitted.

Figure 5:
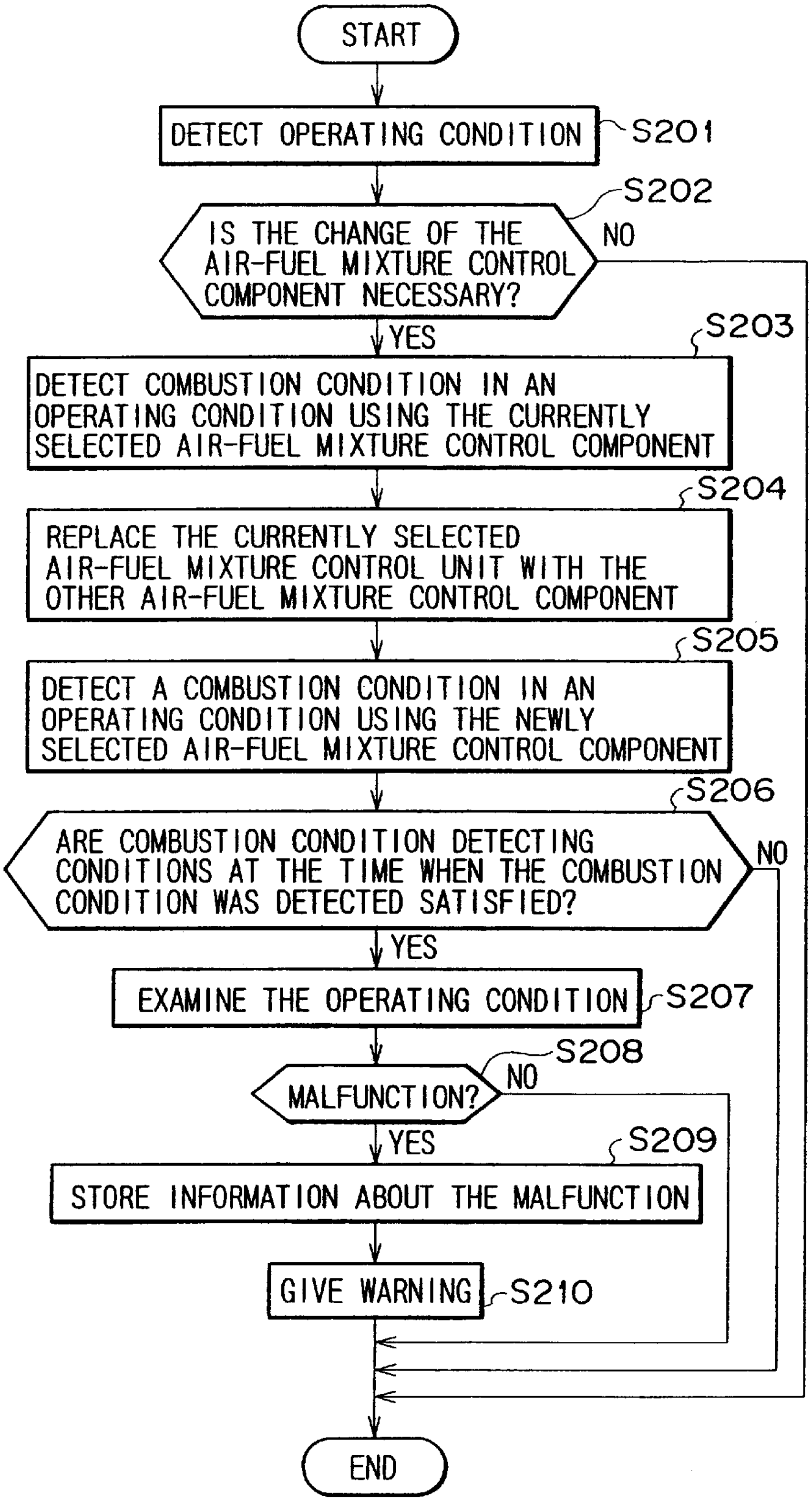
FIG. 5 is a flow chart of another control program to be executed by the air-fuel control system embodying the present invention.

Another control program to be executed by the air-fuel ratio control system will be described with reference to FIG. 5. The control program is executed every predetermined time, for example, every 2 ms, or is started at a predetermined crank angle.

An operating condition is detected in step S201. A query is made in step S202 to see if the operating condition needs the other air-fuel ratio control component. The operating condition may be examined to see if the change of the air-fuel mixture control component brings about any change in the operating condition and the air-fuel mixture control component may forcibly changed. If the operating condition needs the change of the air-fuel mixture control component or permits the change of the air-fuel mixture control component, the control program goes to step S203 and, if not, the control program is ended. In step S203, a combustion condition in an operating condition using the currently selected air-fuel mixture control component is detected. The currently selected air-fuel mixture control component replaced with the other air-fuel mixture control component in step S204. Then, a combustion condition in an operating condition using the newly selected air-fuel mixture control component is detected in step S205. A query is made in step S206 to see if combustion condition detecting conditions at the time when the combustion condition was detected at step S203 or S205 are satisfied; that is, examination is made to see if the sensors are functioning properly, and if the operating condition when the combustion state was detected is stable. The examination of those conditions may be executed before or during the combustion condition detecting operation in step S203 or S205. If the conditions for combustion condition detection are not satisfied, the control program is ended. If the conditions for combustion condition detection are satisfied, the operating condition is examined in step S207 through the comparison of the combustion condition before the change of the air-fuel mixture control component and the combustion condition after the change of the air-fuel mixture control component. If any malfunction is diagnosed, information about the malfunction is stored in step S209, a warning is given in step S210 and then the control program is ended.

Incidentally, the engine is controlled so that the operating conditions in respect of load, such as fuel supply rate, before and after the change of the air-fuel mixture control component are substantially the same, because it is necessary not to make the driver conscious of shocks that may be generated when the air-fuel mixture control component is changed. Therefore the decision of a malfunction made on the basis of the combustion conditions before and after the change of the air-fuel mixture control component is desirable because the same is hard to be affected by effects other than the function to be examined, and the range of variance of parameters for detecting the combustion condition can be narrowed. Since the combustion condition in a state where the two air-fuel mixture control components are used is detected in a short time, the detection of the combustion condition is less affected by factors capable of affecting the combustion condition, such as the atmospheric pressure, humidity and the malfunction of devices other than the fuel supply component.

Figure 6:
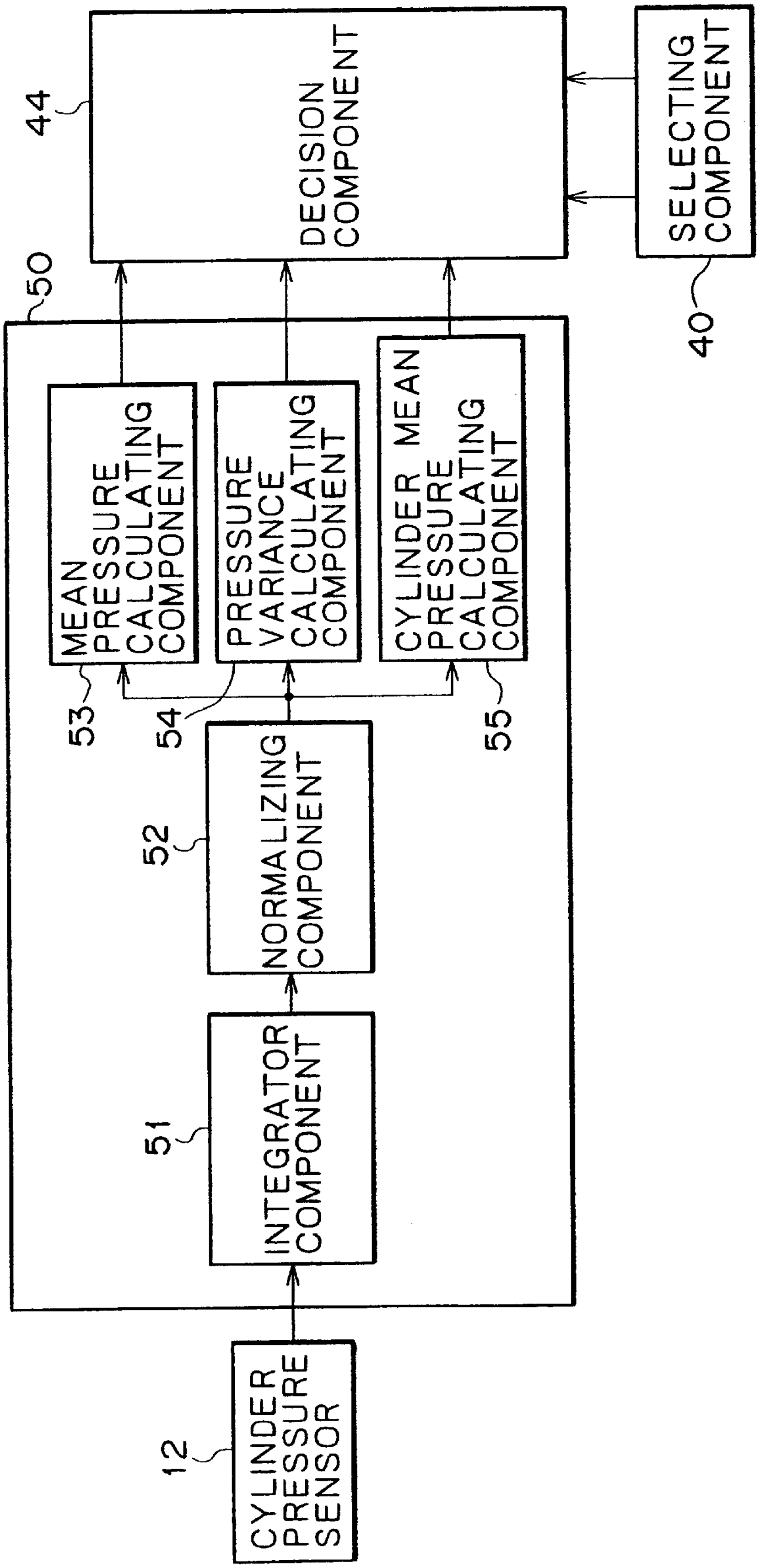
FIG. 6 is a block diagram of a decision component included in the air-fuel control system embodying the present invention.
Figure 7:
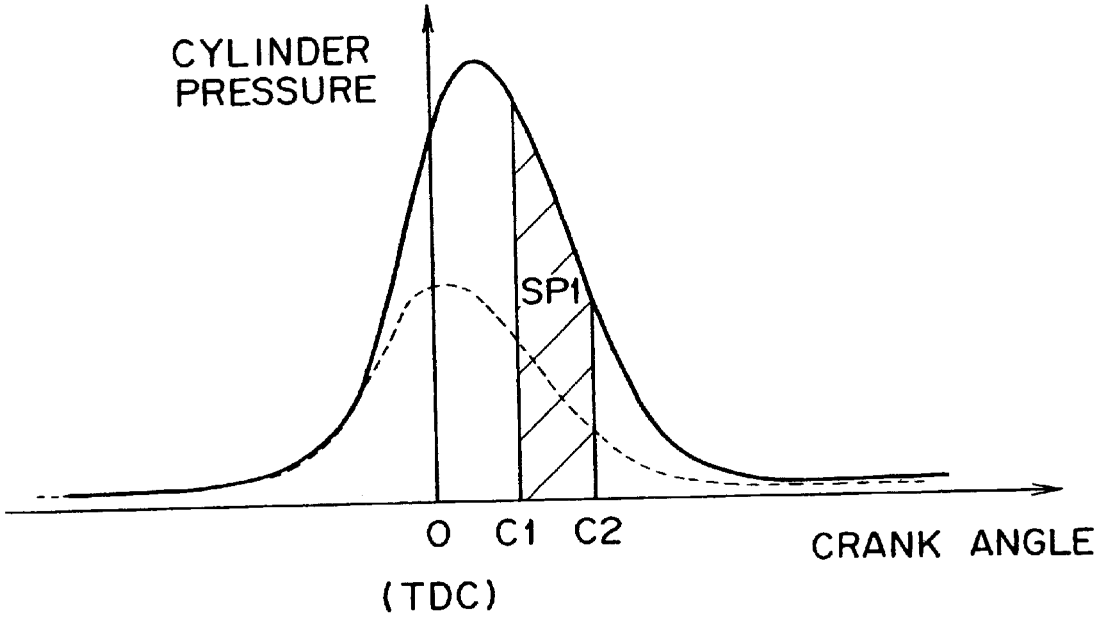
FIG. 7 is a diagram of assistance in explaining the relation between pressure in a cylinder and the operation of a combustion condition detecting component.
Figure 8:
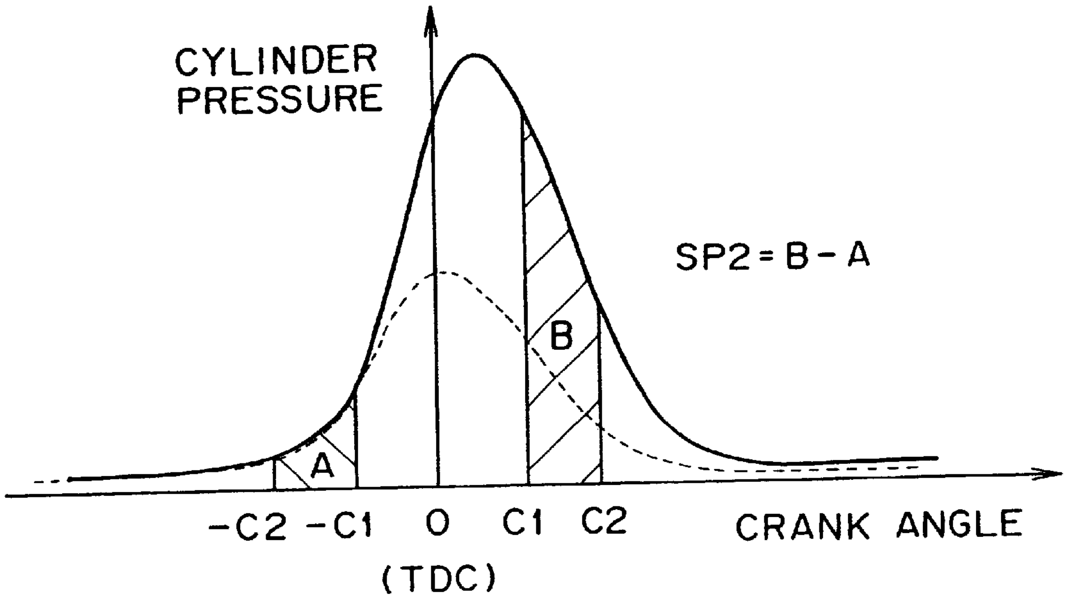
FIG. 8 is a diagram of assistance in explaining the relation between pressure in a cylinder and the operation of another combustion condition detecting component.

A combustion condition detecting device 50 using cylinder pressure will be described with reference to FIG. 6. A cylinder pressure varying as shown in FIG. 7 is measured by the cylinder pressure sensor 12 is given to an integrator component 51 included in the combustion condition detecting device 50. The cylinder pressure is integrated from a crank angle C1 to a crank angle C2 after the top dead center TDC in the explosion stroke either by hardware or software. When hardware is used for integration, the integrator component 51 is cleared at the crank angle C1, the integrator component 51 is held at the crank angle C2, and the value held by the integrator component 51 is read through an A/D converter. When software is used, values of the cylinder pressure are read every predetermined time or every predetermined crank angle between the crank angles C1 and C2, and the total sum of the values of the cylinder pressure is calculated. The integral of the cylinder pressure from the crank angle C1 to the crank angle C2 is SP1. The integral SP1 is large when combustion is satisfactory or the same is small when combustion is unsatisfactory. If the cylinder pressure sensor 12 is a pressure sensor which provides a not very accurate measured cylinder pressure, such as a piezoelectric pressure sensor disposed under the washer of the spark plug 11, it is desirable to calculate the integral A of the cylinder pressure from a crank angle −C2 to a crank angle −C1 before the top dead center of the compression stroke and the integral B of the cylinder pressure from a crank angle C1 to a crank angle C2 after the top dead center of the compression stroke, and to calculate SP2=B−A. Since the value SP2 is practically naught when misfiring occurs, it is suitable to use SP2 to detect a misfiring regardless of the type of the cylinder pressure sensor.

Since SP1 and SP2 vary in proportion to fuel supply rate, NP1 and NP2 are obtained by dividing SP1 and SP2 by fuel supply rate for normalization using a normalizing component 52. The values of NSP1 and NSP2 are large when combustion is satisfactory and are small when combustion is unsatisfactory. As mentioned above, NSP2 is substantially naught when misfiring occurs. Therefore, NSP2 is suitable for detecting misfiring and deciding a combustion condition.

The mean pressure, the pressure variance and the cylinder mean pressures are calculated by using values of NSP1 or NSP2 every predetermined time or every predetermined number of revolution by a mean pressure calculating component 53, a pressure variance calculating component 54 and a cylinder mean pressure calculating component 55. The greater mean pressure and the greater cylinder mean pressure indicate higher combustion pressure. A small pressure variance indicates stable combustion.

The calculated values are given to a decision component 44. The operating condition of the engine is evaluated on the basis of the selection of the air-fuel mixture control component by the selecting component 40 and the calculated values. Decision is made by the following methods (1) and (2).

(1) The operating condition is evaluated from the mean pressure, the pressure variance and the mean pressures for the cylinders in operations in the homogeneous stoichiometric combustion mode, the homogeneous lean combustion mode and the stratified combustion mode. When the mean pressure or the pressure variance is in a predetermined range, it is decided that a malfunction has occurred. When the cylinder mean pressure falls in a predetermined range, it is decided that a malfunction has occurred in the corresponding cylinder. Preferably, thresholds for the mean pressure, the cylinder mean pressure and the pressure variance, which are stored beforehand, are retrieved or calculated on the basis of parameters indicating the operating condition of the engine, such as engine speed, load and the flow of the recirculated exhaust gas, and it is decided that a malfunction has occurred when the mean pressure and the cylinder mean pressure are smaller than the corresponding thresholds or the pressure variance is greater than the corresponding threshold. However, it is difficult to specify a defective part by this method. If the spray pattern of the fuel injected by the fuel injection valve during operation in the stratified combustion mode becomes greatly different from a desired spray pattern, it is possible that an unburned gas is discharged even if the air-fuel mixture burns normally in the combustion chamber. This abnormal condition cannot be detected only from the mean pressure, the pressure variance and the cylinder mean pressure.

(2) Combustion conditions in the homogeneous lean combustion mode and the stoichiometric combustion mode, and the combustion conditions in the homogeneous lean combustion mode and the stratified combustion mode are compared. It is decided that the swirl control valve 6, i.e., the air flow intensifying component, is malfunctioning when the difference between the mean pressures or between the pressure variances is not smaller than a predetermined value. It is decided that the fuel injection valve (spray pattern) of the cylinder is malfunctioning when the difference between the cylinder pressure means of the cylinders is not smaller than a predetermined value. In this case also, it is preferable to retrieve or calculate thresholds for the difference between the mean pressures, or between the cylinder mean pressures or between the pressure variances, respectively, which are stored beforehand, on the basis of parameters indicating the operating condition of the engine, such as engine speed, load and the flow of the recirculated exhaust gas and to use the same for decision. This method which compares the two air-fuel mixture control components is not subject to the effects of the difference between engines, the difference between parts and aging.

It is possible that the difference between the mean pressures, the pressure variances or the cylinder mean pressures is not smaller than the predetermined value when ignition energy is low. Therefore, a part which is highly liable to malfunction is specified. Therefore, it is preferable to store the malfunctioning part decision as information about parts which are highly liable to malfunction and information about the occurrence of malfunctions. Practically, the quality of combustion is deteriorated significantly by the drop of ignition energy. Therefore, it is possible to decide a malfunction on the basis of the mean pressure and the cylinder mean pressure mentioned in (1).

It is more preferable to decide a specific part on the basis of changes in the mean pressure, the pressure variance and the cylinder mean pressure resulting from the change of controlled variable relating to the specified part after the decision of the malfunctioning part.

When a decision is made by the method (2) that the air flow intensifying component is malfunctioning, a temporary decision that the air flow intensifying component is malfunctioning is made. Then, the air flow intensifying component is operated for testing. If the pressure variance does not change or a change in the pressure variance is smaller than a predetermined value, a definite decision that the air flow intensifying component is malfunctioning is made. If the pressure variance changes by a value not smaller than the predetermined value, it is possible to decide that the ignition system is malfunctioning (ignition energy has decreased).

When it is decided by the method (2) that the fuel injection valve 10 is malfunctioning, the injection timing of the fuel injection valve is advanced or delayed by a predetermined value for testing. If the cylinder mean pressure changes by a change not smaller than a predetermined value, a final decision that the fuel injection valve is malfunctioning is made. In this case, if the cylinder mean pressure increases to a value not smaller than a predetermined value and the pressure variance is not greater than a predetermined value when the injection timing is changed, a correction may be made to set the new injection timing as controlled variable and the malfunction decision may be cancelled. If the cylinder mean pressure does not change by a change greater than the predetermined value when the injection timing is changed, it is improper to decide that the fuel injection valve is not malfunctioning. Therefore, it is preferable to store information indicating that there is a high possibility that the cylinder and the fuel injection valve are malfunctioning.

Since the variance is used as a parameter indicating dispersion, the difference between a maximum and a minimum may be used instead of the variance. The frequency of deviation of the calculated values of NSP1 and NSP2 from a predetermined range may be used.

All of the mean pressure, the pressure variance and the cylinder mean pressure of the normalized integral of cylinder pressure need not necessarily be used for making a decision and, naturally, other parameters, such as the position of the peak cylinder pressure, may be used.

Figure 9:
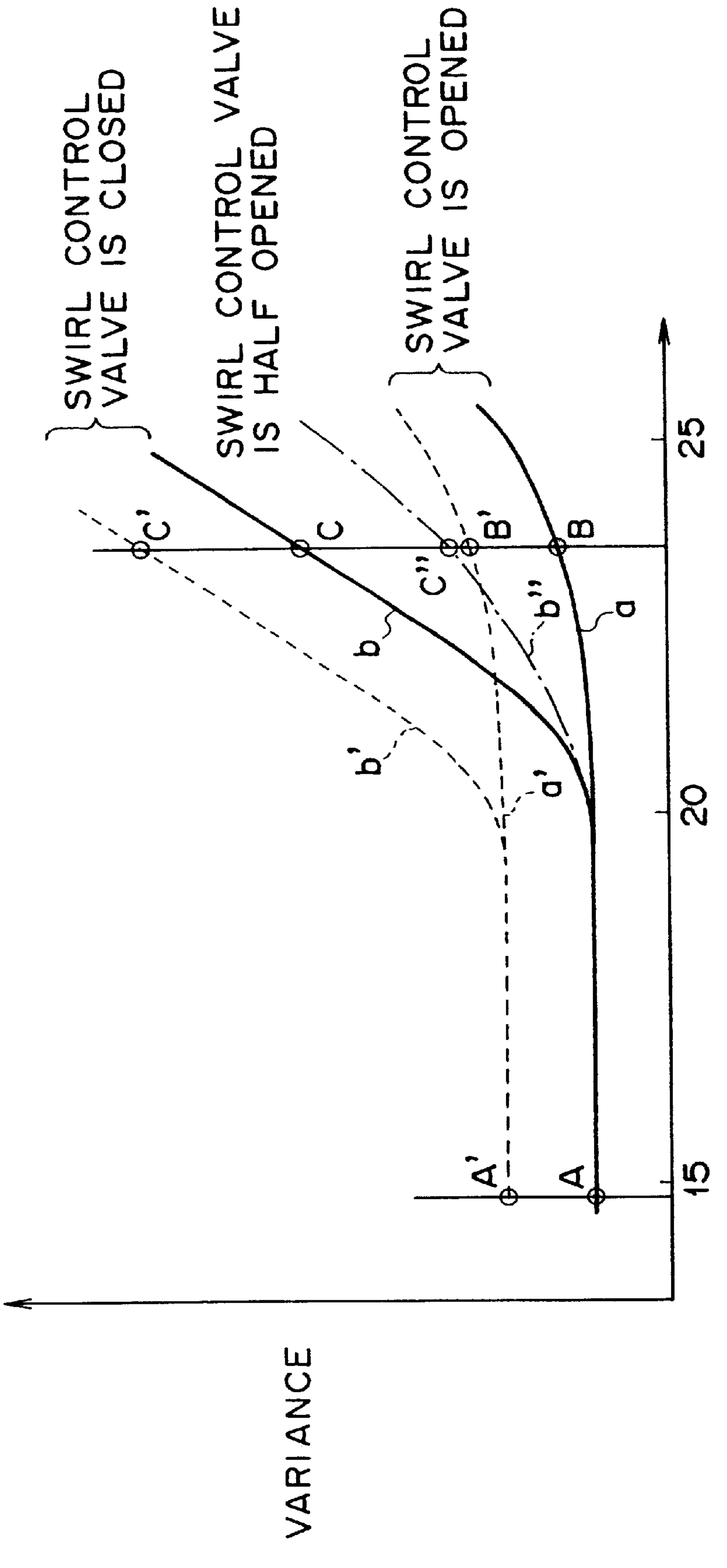
FIG. 9 is a graph of assistance in explaining the relation between the variance of the integral of pressure in a cylinder and the operation of the decision component.

FIG. 9 shows the results of experiments on the variance of NSP1 and NSP2 in the homogeneous stoichiometric combustion mode and the homogeneous lean combustion mode. A malfunction decision component embodying the present invention will be described.

Generally, the variance varies with air-fuel ratio as indicated by a value A in the homogeneous stoichiometric combustion mode. The variance varies with air-fuel ratio as indicated by a value B in the homogeneous lean combustion mode because the swirl control valve as an air flow intensifying component is opened. A curve a indicates the variation of the variance when air-fuel ratio is varied with the swirl control valve kept open. Generally, the swirl control valve is closed in the stoichiometric combustion mode. The variance in a state where the swirl control valve is open is scarcely different from that in a state where the swirl control valve is open. A value C indicates the variation of the variance when the swirl control valve is out of order and remains closed. A curve b indicates the variation of the variance when air-fuel ratio is varied with the swirl control valve kept closed. Thus, it is known that the variance changes when the swirl control valve does not function normally. It is possible to decide that something is wrong with the engine when the variance is not smaller than a predetermined value determined on the basis of parameters indicating the operating condition of the engine, such as engine speed, load and air-fuel ratio, during operation in the homogeneous lean combustion mode.

Sometimes the variance varies along a curve c even if the swirl control valve is open when combustion is unstable due to the aging of the engine or when some component other than the swirl control valve is malfunctioning. In such a case, the value of the variance is A' in operation in the homogeneous stoichiometric combustion mode and is B' in operation in the homogeneous lean combustion mode. If the swirl control valve is kept closed in this state, the variance varies along a curve b'. If the swirl control valve remains half open, the variance varies along a curve b", and the value of the variance is C" in operation in the homogeneous lean combustion mode. It is possible that a wrong decision is made if the condition of the swirl control valve is evaluated simply on the basis of the variance in operation in the homogeneous lean combustion mode in such a state. Even in such a state, it is possible to decide the condition of the swirl control valve accurately through the comparison of the variance in operation in the homogeneous stoichiometric combustion mode and the variance in operation in the homogeneous lean combustion mode.

The variance varies scarcely when the swirl control valve becomes inoperative in a closed state. In such a case, resistance against the flow of intake air increases in an operating condition where the flow rate of intake air is high. Consequently, a malfunction can be detected through the comparison of an estimated flow rate of intake air estimated on the basis of the relation between the opening of the throttle valve 4 detected by the throttle opening sensor 5$a$ and the engine speed and the opening of a bypass air flow control valve, not shown, and the flow rate of intake air detected by the air flow sensor 3. For instance, it is possible to detect a malfunction accurately by deciding that a malfunction has occurred when a change in air flow is not greater than a predetermined value when the combustion mode is changed from the homogeneous stoichiometric combustion mode to the homogeneous lean combustion mode, which requires more intake air than the homogeneous stoichiometric combustion mode. It is also possible to detect a malfunction accurately by comparing the means of the NSP1 and NSP2 in the homogeneous stoichiometric combustion mode and the homogeneous lean combustion mode.

Like for operation in the homogeneous stoichiometric combustion mode and the homogeneous lean combustion mode, the foregoing explanation holds true also for operation in the homogeneous lean combustion mode and the stratified combustion mode, and for operation in the homogeneous stoichiometric combustion mode and the stratified combustion mode. Generally, the intensity of air flow in operation in the stratified combustion mode must be higher than that of air flow in operation in the homogeneous lean combustion mode. Therefore, the opening of the swirl control valve is adjusted according to the combustion mode. If the opening of the swirl control valve cannot properly be adjusted when the combustion mode is changed, i.e., when the air-fuel mixture control component is changed, the values of P are compared to detect the condition of the swirl control valve.

The air flow intensifying component need not be limited to the swirl control valve, but may be, for example, a tumble control valve.

This embodiment is particularly suitable for detecting the condition of the air flow intensifying component.

Figure 10:
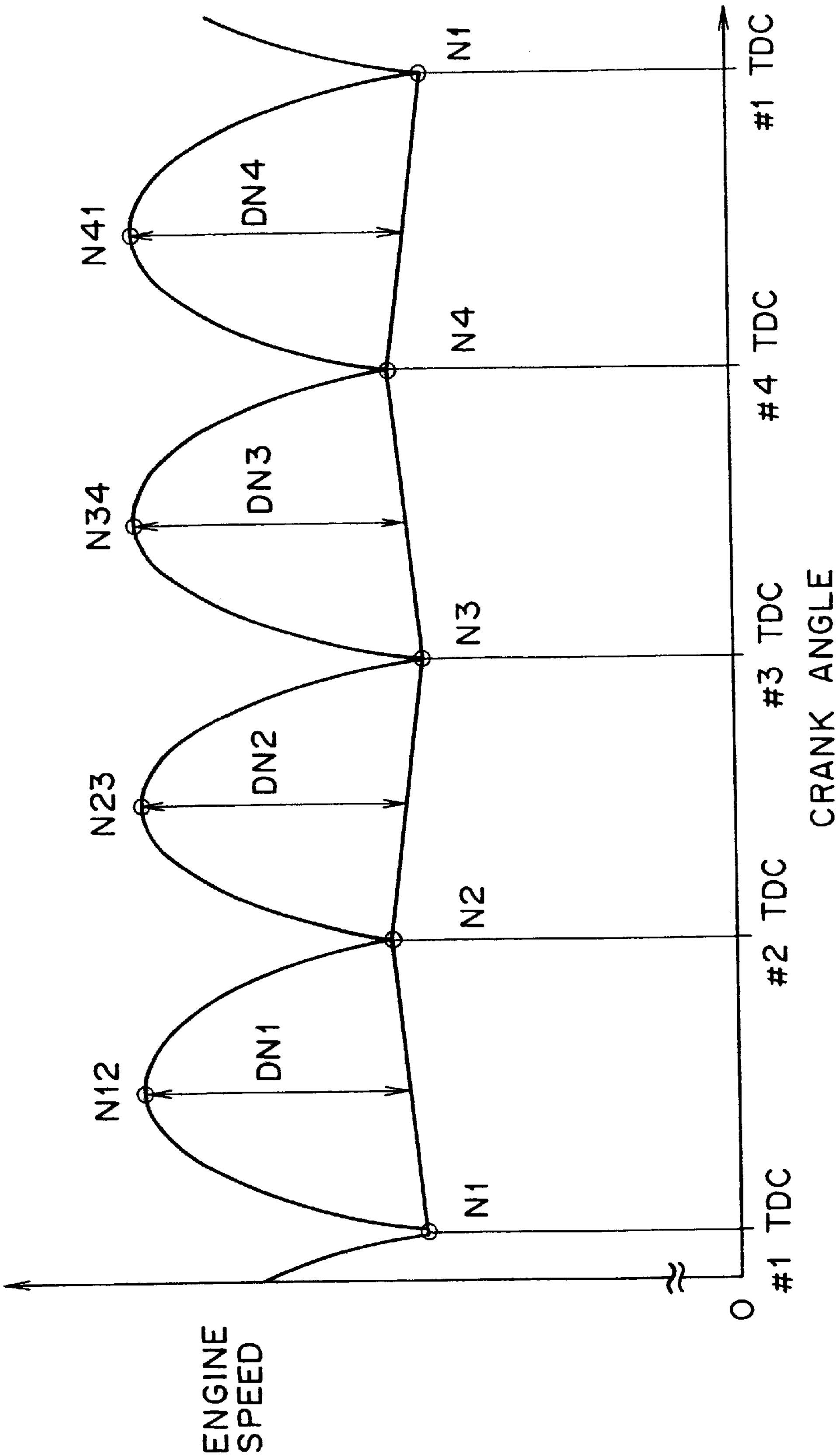
FIG. 10 is a graph showing the relation between the variation of rotating speed and the operation of the combustion condition detecting component.

A combustion condition detecting component embodying the present invention using engine speed will be described hereinafter. FIG. 10 is a graph showing the variation of the engine speed of a four-cylinder engine. Referring to FIG. 10, engine speeds N1, N2, . . . at crank angles near TDCs in the compression strokes, and engine speeds N12, N23, . . . at crank angles between TDCs are measured. DN1=N12−(N1+N2)/2, DN2=N23−(N2+N3)/2, . . . are calculated. Engine speed can be determined by calculation using a measured time necessary for the crankshaft to turn through a predetermined angle. The variation of engine speed is due to the effect of the inertial forces of the pistons of the engine (a torque of a phase substantially opposite that of the torque generated by the combustion gas is generated and the effect of which increases as the engine speed increases) and the effect of engine speed (which decreases as the engine speed increases). Therefore, values corresponding to torques generated by the cylinders, i.e., values corresponding to cylinder pressures, can be determined by correcting DN1, DN2, . . . on the basis of the engine speed. The mean, the variance and the cylinder mean are determined by normalization using fuel supply rate. A decision procedure using the data about engine speed is substantially the same as the decision procedure using the data about cylinder pressure. The essential function of this embodiment is to obtain a value corresponding to cylinder pressure or generated torque on the basis of engine speed and hence there is no restriction on the system.

A combustion condition detecting component in another embodiment using engine speed will be described.

As mentioned previously with reference to FIG. 10, engine speeds N1, N2, . . . at crank angles near TDCs in the compression strokes are measured, and dN1=N2−N1, dN2=N3−N2, . . . are calculated. The calculated values are corrected on the basis of engine speed and are normalized by fuel supply rate. Since the calculated values are subject to the effect of change in engine speed while engine speed is increasing or decreasing, i.e., while the engine is accelerating or decelerating, it is preferable to correct errors attributable to the effect of change in engine speed. Thus, the difference between the torques generated by the adjacent cylinders or between values corresponding to the cylinder pressures of the adjacent cylinders can be obtained. In this system, the mean of all the values is naught and only relative values between the cylinders can be detected. Therefore, the mean of all the values is not calculated and the variance and the cylinder mean are calculated. The decision procedure is substantially the same as that employed when cylinder pressure is used. The following is added to the cylinder mean.

Figure 11:
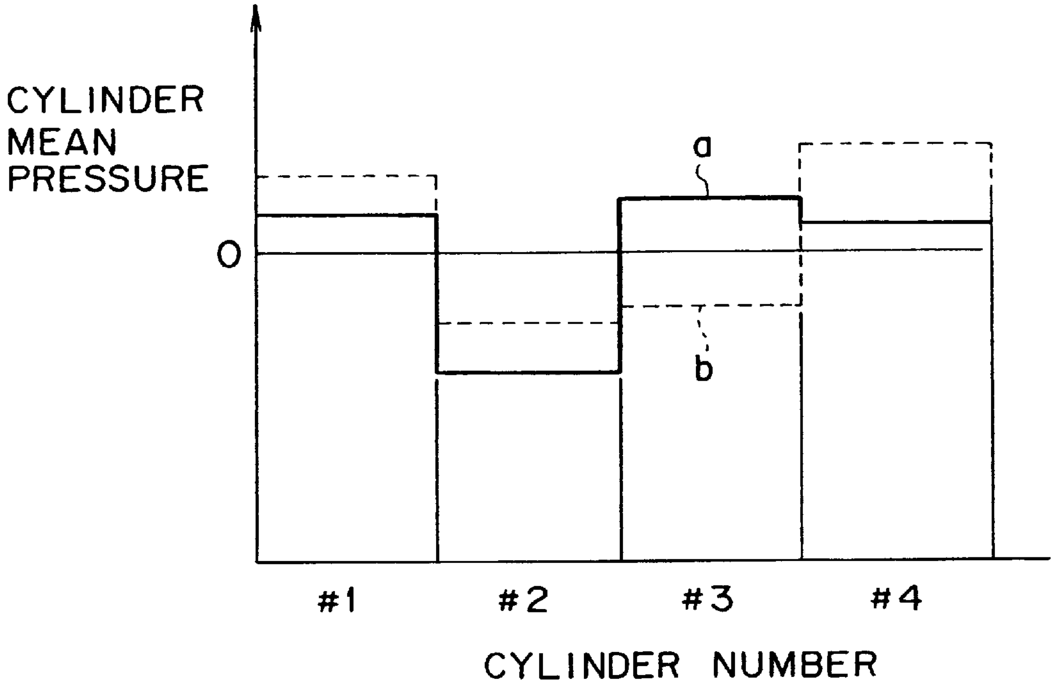
FIG. 11 is a graph of assistance in explaining the parameters of combustion condition.
Figure 12:
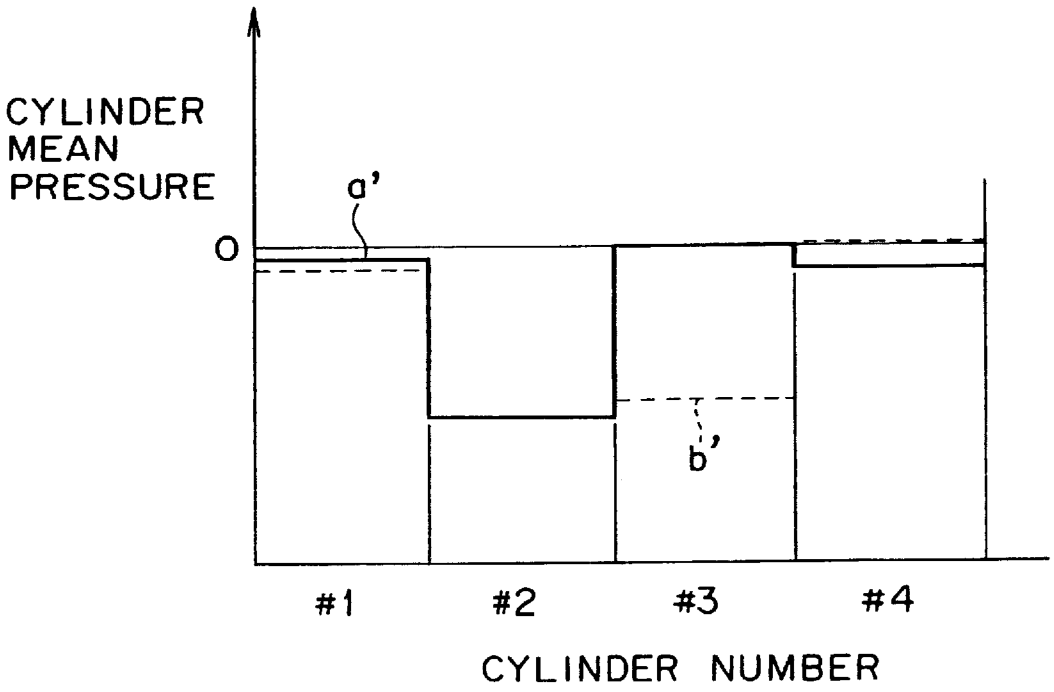
FIG. 12 is a graph of assistance in explaining a method of correcting the parameters of combustion condition.

Since this embodiment uses relative values indicating combustion condition between the cylinders, the cylinders have the values of cylinder mean as indicated by a continuous line a in FIG. 11 when combustion in the one cylinder (cylinder #2) is bad, and the cylinders have the values of cylinder mean indicated by a broken line b in FIG. 11 when combustion in the two cylinders (cylinders #2 and #3) is bad. When these values are used, it is difficult to determine a threshold for identifying malfunctions and it is possible that a wrong decision is made on the basis of the difference between values obtained when the air-fuel mixture control component is changed. Therefore, the greatest one of the values of cylinder mean of the cylinders is used as a reference, and the differences of the values from the reference are used as new values of cylinder mean. Values of cylinder mean thus determined are shown in FIG. 12, in which lines a' and b' correspond to lines a and b in FIG. 11, respectively.

A combustion condition detecting component in a further embodiment using engine speed will be described. As mentioned in connection with FIG. 10, engine speed is measured every predetermined crank angle or every predetermined time. A predetermined frequency component is extracted from the variation of the measured values of engine speed, and the power or the magnitude P of the frequency component is determined. A preferable frequency band from which the frequency component is extracted is in the range of 3 to 8 Hz. Since the vehicle acts as a spring-mass system, the resonant frequency band in the range of about 3 to about 8 Hz is emphasized when the variation of combustion is detected from the variation of engine speed. It is preferable not to include frequency components corresponding to the high-order components of rotation in the frequency band.

Extraction may be achieved by using a digital filter of software. The two air-fuel mixture control components compare the magnitude P to decide a malfunction.

The value of P varies similarly to variation in the case where the variances of NSP1 and NSP2 based on cylinder pressure as mentioned in connection with FIG. 9 are used. Accordingly, the effect of a method of deciding a malfunction is similar to that using the variances of NSP1 and NSP2.

Although the preferred embodiments have been described, those embodiments may be used individually or in combination for deciding a malfunction.

Although the invention has been described as applied to the engine of the cylinder injection system, the present invention is not limited thereto in its practical application. For instance, the present invention is applicable to an engine of the port injection system capable of injecting the fuel for both the homogeneous lean combustion mode and the homogeneous stoichiometric combustion mode.

The combustion condition detecting component may be other than those which detect combustion condition on the basis of cylinder pressure and engine speed, respectively. The present invention can be realized by a general sensor often mounted on the engine for ordinary control. The embodiments which detects combustion condition on the basis of cylinder pressure and engine speed have been described to prove that the present invention can be embodied without requiring any additional sensors. Thus, the present invention can be embodied without entailing significant increase in cost.

Combustion condition can be detected on the basis of generated torque or ion current. The methods described herein and those possible methods can be used in combination.

As is apparent from the foregoing description, the engine malfunction diagnosing system in accordance with the present invention diagnoses a malfunction on the basis of combustion conditions in operating conditions respectively using the two air-fuel mixture control components. Therefore, the malfunction of the air-fuel mixture control components including the intake air flow intensifying components and the fuel supply component can be detected and a malfunctioning part can be specified without being affected by the difference between different engines, the difference in quality between parts and aging.

What is claimed is:

1. A method for diagnosing one or more malfunctioning components in an engine, the method comprising:

(a) selecting either a first air-fuel mixture control component or a second air-fuel mixture control component according to operating condition of the engine;

(b) detecting combustion condition of the engine; and (c) diagnosing a malfunction by comparing a first combustion condition detected in a state where the first air-fuel mixture control component is selected with a second combustion condition detected in a state where the second air-fuel mixture control component is selected.

2. The method of claim 1, wherein the diagnosing step (c) diagnoses one or more of a malfunction in an air flow intensifying component, a malfunction of a fuel supply component, or a drop in ignition energy.

3. A diagnosing system for an engine comprising:

a selecting component for selecting either a first air-fuel mixture control component or a second air-fuel mixture control component according to operating condition of an engine;

a combustion condition detecting component for detecting combustion condition of the engine; and a decision component for diagnosing a malfunction by comparing a first combustion condition detected by the combustion condition detecting component in a state where the first air-fuel mixture control component is selected by the selecting component, with a second combustion condition detected by the combustion condition detecting component in a state where the second air-fuel mixture control component is selected by the selecting component.

4. The diagnosing system for an engine according to claim 3, wherein the selecting component selects either the first air-fuel mixture control component which supplies the fuel so that an air-fuel mixture has a homogeneous fuel concentration or the second air-fuel mixture control component which supplies the fuel so that an air-fuel mixture has a stratified fuel concentration.

5. The diagnosing system for an engine according to claim 3, wherein the selecting component selects the first air-fuel mixture control component which supplies the fuel so that a stoichiometric air-fuel mixture having a stoichiometric air-fuel ratio is produced or the second air-fuel mixture control component which supplies the fuel so that a lean air-fuel mixture having an air-fuel ratio greater than a stoichiometric air-fuel ratio is produced.

6. The diagnosing system for an engine according to claim 3, wherein the combustion condition detecting component detects combustion condition on the basis of engine speed.

7. The diagnosing system for an engine according to claim 3, wherein the combustion condition detecting component detects combustion condition on the basis of pressures in combustion chambers of the engine.

8. The diagnosing system for an engine according to claim 3 further comprising at least either a malfunction storage component for storing information about a malfunction when the decision component decides that a malfunction has occurred or a warning component for providing a warning that a malfunction has occurred when the decision component decides that a malfunction has occurred.

9. The diagnosing system of claim 3, where the diagnosing component diagnoses one or more of a malfunction in an air flow intensifying component, a malfunction of a fuel supply component, or a drop in ignition energy.

10. The diagnosing system for an engine according to claim 3, wherein the decision component diagnoses a malfunction by comparing a combustion condition in a state where the first air-fuel mixture control component is selected by the selecting component with a combustion condition in a state where the second air-fuel mixture control component is selected by the selecting component in operating conditions which are substantially the same at least in fuel supply rate, and load.

11. The diagnosing system for an engine according to claim 10, wherein the decision component diagnoses a malfunction by comparing combustion conditions before and after the selection of the first air-fuel mixture control component or the second air-fuel mixture control component by the selecting component.

12. The diagnosing system according to claim 10, wherein the load is generated torque.

* * * * *